Patented May 18, 1954

2,678,926

UNITED STATES PATENT OFFICE 2,678,926

DIALKYL PHENOTHIAZINE SULFONES

Nathan L. Smith, United States Navy, assignor to the United States of America as represented by the Secretary of the Navy No Drawing. Application April 4, 1952,
Serial No. 280,637

3 Claims. (Cl. 260—243)

(Granted under Title 35, U. S. Code (1952), sec. 266)

This invention relates to new phenothiazine compounds, more particularly to new dialkyl phenothiazine sulfones.

The new compounds are di(1,1,3,3-tetramethylbutyl)phenothiazine-sulfones (dioxides) of the general formula:

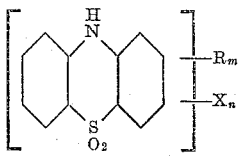

wherein R is an ar-substituted 1,1,3,3-tetramethylbutyl radical, m is 2, X is an ar-substituted fluoro or trifluoromethyl radical which may be the same or different, and n is an integer from 0 to 2. They are characterized by a high degree of solubility in mineral and fatty oils due to the presence of the branched chain tetramethylbutyl groups in the molecule and are useful as insecticides. The structure of the 3,7-bis(1,1,3,3-tetramethylbutyl)phenothiazine-5-sulfone indicates chemotherapeutic activity for this compound in respect to pulmonary tuberculosis.

The new sulfones can be prepared by oxidizing the corresponding dialkyl phenothiazines which form the subject matter of my copending application Serial No. 280,638, filed April 4, 1952, now abandoned. The oxidation reaction is carried out by warming a mixture, under stirring, of the dialkyl phenothiazine and hydrogen peroxide in glacial acetic acid. A preferred range of reaction temperatures is from 50 to 150° C. although somewhat higher and lower temperatures may also be used. The product is precipitated by dilution of the reaction mixture, with water and separated by filtration. The product may be recrystallized, decolorized by absorptive materials such as bone charcoal, or subjected to other standard purification methods.

The starting dialkyl phenothiazines can be conveniently prepared by thionation of the corresponding unsubstituted and fluoro and/or trifluoromethyl substituted dialkyl diphenylamines using an iodine catalyzed modification of Bernthsen's sulfur fusion method, a trace of iodine functioning to promote the reaction, Knoevenagel, J. Prakt. Chem., 197, 1 (1914). The intermediate dialkyl diphenylamines can be prepared in known way from the corresponding acetanilides and monobromobenzenes following the method of Goldberg, Ber. 40, 4541 (1907).

The invention is further illustrated by the following specific example to which, however, it is not intended that it be limited. Parts are by weight in the metric system unless otherwise indicated.

Example

A mixture of 1 part of 3,7-bis(1,1,3,3-tetramethylbutyl)phenothiazine, 30 ml. of glacial acetic acid and 15 ml. of 30% hydrogen peroxide was refluxed for an hour under stirring. The reaction mixture was then poured into ice-water, filtered, and the product crystallized from ethanol. The 3,7-bis(1,1,3,3-tetramethylbutyl)-phenothiazine-5-sulfone was recrystallized from ethanol, yielding 0.5 part (47%) of peach colored needles, M. P. 294–295° C. (decomp.).

The invention described herein may be manufactured and used by or for the Government of the United States of America for governmental purposes without the payment of any royalties thereon or therefor.

What I claim is:

1. A dialkyl phenothiazine sulfone of the general formula:

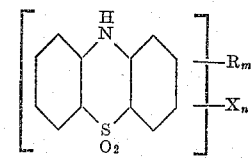

wherein R is an ar-substituted 1,1,3,3-tetramethylbutyl radical, m is 2, X is an ar-substituent selected from the group consisting of the fluoro and trifluoromethyl radicals, and n is an integer from 0 to 2.

2. 3,7 - bis(1,1,3,3 - tetramethylbutyl)phenothiazine-5-sulfone.

3. A dialkyl phenothiazine sulfone of the general formula:

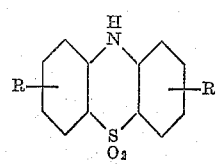

wherein R is the 1,1,3,3-tetramethylbutyl radical.

References Cited in the file of this patent

UNITED STATES PATENTS

| Number | Name | Date |
|---|---|---|
| 2,483,838 | Niederl | Oct. 4, 1949 |
| 2,512,520 | Cusic | June 20, 1950 |
| 2,591,679 | Cusic | Apr. 8, 1952 |